(12) United States Patent
Fujita et al.

(10) Patent No.: US 8,417,571 B2
(45) Date of Patent: Apr. 9, 2013

(54) INFORMATION PROCESSING SERVER, AND INFORMATION PROCESSING METHOD

(75) Inventors: Norihiko Fujita, Tokyo (JP); Shigeyuki Kawai, Yokohama (JP); Makoto Yamada, Yokohama (JP); Mikihisa Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/310,694

(22) PCT Filed: Sep. 5, 2006

(86) PCT No.: PCT/JP2006/317534
§ 371 (c)(1),
(2), (4) Date: Jul. 8, 2009

(87) PCT Pub. No.: WO2008/029447
PCT Pub. Date: Mar. 13, 2008

(65) Prior Publication Data
US 2010/0004996 A1    Jan. 7, 2010

(51) Int. Cl.
*G06Q 30/00* (2012.01)
(52) U.S. Cl. .................................. 705/14.64
(58) Field of Classification Search .......... 705/14, 705/14.64
See application file for complete search history.

(56) References Cited

U.S. PATENT DOCUMENTS

2002/0013727 A1* 1/2002 Lee .................................. 705/14
2003/0163385 A1* 8/2003 Mori et al. ...................... 705/26

FOREIGN PATENT DOCUMENTS

| EP | 1610245 | 12/2005 |
|----|---------|---------|
| JP | 2002 092520 | 3/2002 |
| JP | 2002 117351 | 4/2002 |
| JP | 2002-352173 | 12/2002 |
| JP | 2006 155286 | 6/2006 |
| JP | 2006 227817 | 8/2006 |

OTHER PUBLICATIONS

"Global Electronic Money and Related Issues; Misra, Santosh K.; Javalgi, Rajshekhar G.; Scherer, Robert F.; Review of Business, v25n2, pp. 15-24; Spring 2004".*
European office action for corresponding EP06797440 dated Mar. 16, 2011.

* cited by examiner

*Primary Examiner* — John Weiss
*Assistant Examiner* — Michael Stibley
(74) *Attorney, Agent, or Firm* — K&L Gates LLP

(57) ABSTRACT

It is an object to increase advertising effectiveness by a synergetic effect between communication using a mobile phone or the like, and an electronic money system. The present embodiment is configured such that an advertisement is transmitted to a user's mobile phone via e-mail, and if the user purchases an article in values based on the advertisement, cashback is performed through the user's mobile phone in values. Thus, giving a feeling of value to the user makes it possible not only to increase advertising effectiveness but also to confirm the advertising effectiveness. If purchasing an article in values according to an advertising mail sent to a mobile phone 3, the user can receive the cashback from an electronic money server 2, thus allowing the user to obtain a feeling of value. Moreover, the electronic money server 2 can know whether or not the user has conducted purchasing activities in accordance with the advertising mail, allowing the advertising effectiveness to be measured and confirmed.

4 Claims, 11 Drawing Sheets

FIG.4

(a) USER INFORMATION DATABASE    12

| ELECTRONIC MONEY TERMINAL ID | NAME | E-MAIL ADDRESS | ADDRESS | AGE | SEX | ... |
|---|---|---|---|---|---|---|
| 12345678 | YAMADA TARO | taro@email.com | TOKYO... | 25 | MALE | ... |
| ... | ... | ... | ... | ... | ... | ... |

(b) AFFILIATED STORE DATABASE    14

| AFFILIATED STORE ID | AFFILIATED STORE NAME | AFFILIATED STORE TERMINAL ID | ADDRESS | ... |
|---|---|---|---|---|
| 765 | ABC DEPARTMENT STORE | 8796,7896,1423,... | TOKYO... | ... |
| ... | ... | ... | ... | ... |

(c) ADVERTISEMENT REQUEST DATABASE    11

| ADVERTISING ID | AFFILIATED STORE ID | ADVERTISING INFORMATION | TARGET INFORMATION | RECEPTION DATE | CASHBACK CONDITION | CASHBACK AMOUNT | ... |
|---|---|---|---|---|---|---|---|
| 130 | 765 | ADVERTISEMENT.TXT | TOKYO, MALE | 2/25/ 16:00 | 2/25 10:00~12:00 PURCHASE OF 5000 YEN OR MORE | 10% OF SETTLEMENT AMOUNT | ... |
| ... | ... | ... | ... | ... | ... | ... | ... |

(d) ADVERTISEMENT DESTINATION DATABASE    13

| ADVERTISING ID | ELECTRONIC MONEY TERMINAL ID | ... |
|---|---|---|
| 130 | 12345678,... | ... |
| ... | ... | ... |

(e) LOG DATABASE    15

| AFFILIATED STORE TERMINAL ID | ELECTRONIC MONEY TERMINAL ID | CHARGE AMOUNT | SETTLEMENT AMOUNT | DATE | ... |
|---|---|---|---|---|---|
| 765 | 12345678 | – | 5000 YEN | 2/25 10:30 | ... |
| ... | ... | ... | ... | ... | ... |

INFORMATION PROCESSING SERVER, AND INFORMATION PROCESSING METHOD

CROSS-REFERENCE TO RELATED APPLICATIONS

This application is a U.S. national stage application of International Application No. PCT/JP2006/317534, filed Sep. 5, 2006, and published in a non-English language.

TECHNICAL FIELD

The present invention relates to an information processing server and an information processing method, and relates to what processes information by, for example, an electronic money system.

BACKGROUND ART

A commercial transaction using an electronic money system has come to be widely performed with rapid progress of ID technology in recent years.

The commercial transaction using the electronic money system is performed by operating electronic information called "value" having an exchange value equivalent to money to transfer value.

Generally, the value is written in an IC chip (hereinafter, referred to as electronic money chip) incorporated in a mobile phone or an IC card owned by the user, and an amount that this value represents can be rewritten by inputting amount changing information via a unit called a reader/writer.

Purchase of articles/service by rewriting the value as described above can be performed at an affiliated shop managed by a business enterprise (affiliated store) that has made a contract of performing the commercial transaction in values.

The affiliated store is provided with an affiliated store terminal equipped with the reader/writer at a shop counter of the affiliated shop, and settlement is made by subtracting the value stored in a user's electronic money chip by a payment.

Meanwhile, the user can also pay money to the affiliated store to have the value equivalent to the amount written in the electronic money chip by the reader/writer. Processing of writing the value in the electronic money chip is called "charge".

Other than this, the charge can be performed by putting cash into a cash receiving machine, or alternatively, it can also be performed from a server device installed on the network, using withdrawal from a bank account or settlement by a credit card.

An electronic money card in which an electronic money chip is incorporated in a plastic card has conventionally been common, but with the rapid spread of the mobile phone in recent years, a system which incorporates the electronic money chip in the mobile phone and utilizes a synergetic effect with a communication function of the mobile phone has come to be widely used.

A technology of treating electronic money by the mobile phone in such a way includes an electronic money settlement system using the mobile phone disclosed in the following document.

Patent Document 1: Japanese Unexamined Patent Publication (Kokai) No. 2002-352173

This technology intends to perform settlement in values stored in the mobile phone using the communication function that the mobile phone has.

DISCLOSURE OF INVENTION

Technical Problem

However, the conventional sales promotion technique utilizing the communication function of the mobile phone is a level of presenting advertising information to the general public on a website of the Internet, for example, so that there has been no technology that effectively exhibits the synergetic effect between the value stored in the mobile phone and the sales promotion.

It is therefore an object of the present invention to increase the advertising effectiveness using the synergetic effect between the communication by the mobile phone or the like, and the electronic money system.

Technical Solution

In order to achieve the object, the present invention provides in the invention according to claim 1 an information processing server used in an information processing system that is constituted by a monetary terminal that is specified by a monetary terminal ID associated with an advertising information destination, stores an amount of monetary value as electronic data, and can change the stored amount using amount changing information, an amount changing information input terminal that inputs the amount changing information into the monetary terminal, and an information processing server that can communicate with the monetary terminal and the amount changing information input terminal, the information processing server comprising: advertisement transmitting means for transmitting advertising information to the advertising information destination; associating means for associating the monetary terminal ID associated with the advertising information destination to which the advertising information is transmitted, and an advertising ID of the advertising information to be transmitted with each other to store them in storage means; ID information receiving means for receiving from the amount changing information input terminal the monetary terminal ID of the monetary terminal that has inputted the amount changing information, and advertising ID specifying information for specifying the advertising ID; checking means for checking a first group composed of the monetary terminal ID and the advertising ID associated with each other by the associating means, and a second group composed of the received monetary terminal ID and the advertising ID specified by the received advertising ID specifying information; and amount changing information transmitting means for transmitting to the monetary terminal specified by the associated monetary terminal ID the amount changing information for adding a prescribed amount, if the first group and the second group are coincident with each other in the checking means.

In the invention according to claim 2, there is provided the information processing server according to claim 1, wherein the checking means determines a before-and-after relation between an advertisement transmission point when the advertisement transmitting means has transmitted the advertising information, and an amount changing point when the amount changing information input terminal has inputted the amount changing information into the monetary terminal, and if the amount changing point is before the advertisement transmission point, it determines that the first group and the second group are not coincident with each other.

In the invention according to claim 3, there is provided the information processing server according to claim 1 or 2, further comprising: change amount receiving means for receiving a changed amount changed by the monetary terminal according to the amount changing information that is inputted into the monetary terminal by the amount changing information input terminal; and prescribed amount calculating means for calculating the prescribed amount using the received changed amount.

In the invention according to claim 4, there is provided the information processing server according to any one of claims 1 to 3, wherein the advertising ID is associated with an article ID, and the ID information receiving means receives the article ID of the article purchased in exchange for the input of the amount changing information to the monetary terminal as the advertising ID specifying information.

In the invention according to claim 5, there is provided an information processing method performed by an information processing server used in an information processing system that is constituted by a monetary terminal that is specified by a monetary terminal ID associated with an advertising information destination, stores an amount of monetary value as electronic data, and can change the stored amount using amount changing information, an amount changing information input terminal that inputs the amount changing information into the monetary terminal, and an information processing server that can communicate with the monetary terminal and the amount changing information input terminal, wherein the information processing server is provided with advertisement transmitting means, associating means, ID information receiving means, checking means, and amount changing information transmitting means, wherein the information processing method comprises: an advertisement transmitting step of transmitting the advertising information to the advertising information destination by the advertisement transmitting means; associating step of associating the monetary terminal ID associated with the advertising information destination to which the advertising information is transmitted, and an advertising ID of the advertising information to be transmitted with each other by the associating means to store them in storage means; an ID information receiving step of receiving from the amount changing information input terminal the monetary terminal ID of the monetary terminal that has inputted the amount changing information, and advertising ID specifying information for specifying the advertising ID, by the ID information receiving means; a checking step of checking a first group composed of the monetary terminal ID and the advertising ID associated with each other by the associating means, and a second group composed of the received monetary terminal ID and the advertising ID specified by the received advertising ID specifying information, by the checking means; and amount changing information transmitting step of transmitting to the monetary terminal specified by the associated monetary terminal ID the amount changing information for adding a prescribed amount, by the amount changing information transmitting means, if the first group and the second group are coincident with each other in the checking means.

Advantageous Effects

According to the present invention, the advertising effectiveness utilizing the electronic money system can be increased.

BEST MODE FOR CARRYING OUT THE INVENTION (A) Summary of Embodiment

The present embodiment is configured such that an advertisement is transmitted to a user's mobile phone via e-mail, and if the user purchases an article in values based on the advertisement, cashback is awarded in values to the user's mobile phone.

Thus, giving a feeling of value to the user makes it possible not only to increase advertising effectiveness but also to confirm the advertising effectiveness.

Here, a summary of the present embodiment will be described using a conceptual diagram shown in FIG. 1.

An electronic money chip for storing and processing the value is embedded in a mobile phone 3 that a user has, and a unique electronic money terminal ID is given to this electronic money chip.

An affiliated store terminal 5 is constituted by a cash register or the like, which is installed in an accounting area of an affiliated store, and amount changing information can be inputted into the mobile phone 3 using a reader/writer.

It is to be noted that when the information is particularly distinguished, the amount changing information for adding the value will be called addition information, and money amount updating information for subtracting the value will be called subtraction information, in the followings.

In the system constituted as described above, the cashback is performed according to the numerical order shown in the parentheses.

(1) An electronic money server 2 stores the electronic money terminal ID and an advertising ID while associating them with each other, it subsequently transmits the advertisement of this affiliated store to the user's mobile phone 3 via the e-mail.

Incidentally, the e-mail relating to the advertisement will be hereinafter called advertising mail.

(2) The user browses the advertising mail by the mobile phone 3, and goes for shopping at a shop of the affiliated store according to an advertising content. Subsequently, the user purchases an article in values stored in (the electronic money chip of) the mobile phone 3.

Settlement is performed by inputting the subtraction information into the mobile phone 3 from the affiliated store terminal 5 to thereby subtract the value stored in the mobile phone 3.

(3) The affiliated store terminal 5 accumulates log data on the settlement, and transmits it to the electronic money server 2 by batch processing. The log data includes the electronic money terminal ID of the mobile phone 3 that has performed settlement, an affiliated store terminal ID that is ID information of the affiliated store terminal 5, and the like.

Subsequently, the electronic money server 2 receives and stores the log data transmitted from the affiliated store terminal 5.

The affiliated store terminal ID is associated with an affiliated store ID of the affiliated store that utilizes the affiliated store terminal 5, and the advertising ID is further associated with the affiliated store ID.

As a result, the electronic money server 2 can obtain correspondence between the electronic money terminal ID and the advertising ID from the log data by using this correspondence relation.

(4) The electronic money server 2 checks a combination between the electronic money terminal ID and the advertising ID stored upon transmission of the advertising mail, and a combination between the electronic money terminal ID and the advertising ID obtained from the log data.

As a result of the checking, if there is the same combination, it turns out that this user has purchased the article at the shop of the affiliated store according to the advertising mail.

(5) The electronic money server 2 transmits e-mail for performing the cashback (hereinafter, referred to as cashback mail) to the checked user's mobile phone 3.

This cashback mail includes a URL (Uniform Resource Locators) of a website provided by the electronic money server 2 in order for the electronic money server 2 to transmit the addition information to the mobile phone 3.

The user accesses this URL from the mobile phone 3 to have addition information sent from the electronic money server 2, and increases the amount of the value currently stored in the mobile phone 3 using this addition information.

As described above, if the user purchases the article in values according to the advertising mail sent to the mobile phone 3, the user can receive the cashback from the electronic money server 2, thus allowing the user to obtain a feeling of value.

Subsequently, the electronic money server 2 can increase advertising effectiveness by the feeling of value given to the user.

In addition, the electronic money server 2 can know whether or not the user has conducted a purchasing activity in accordance with the advertising mail, thus allowing the advertising effectiveness to be measured and confirmed.

Incidentally, the present embodiment employs, as one of the examples, a configuration in which the affiliated store terminal 5 accumulates the log data which have recorded the processing contents with the mobile phone 3, and collectively transmits them to the electronic money server 2 by the batch processing later, but not being limited to this, it may be configured such that the affiliated store terminal 5 transmits the log data to the electronic money server 2 in real time via the network. Such configuration makes it possible for the user to perform settlement by the affiliated store terminal 5, and also to receive the cashback simultaneously.

(B) Details of Present Embodiment

FIG. 2 is a network diagram showing one example of a configuration of an electronic money system 1 in accordance with the present embodiment.

The electronic money system 1 is composed of the mobile phone 3, the electronic money server 2, affiliated store servers 4, the Internet 72, a base station 70, a telephone network 71, the affiliated store terminals 5, 5, 5, . . . , and the like.

Hereinafter, if the affiliated store terminals 5, 5, 5, . . . are not distinguished in particular, they are merely described as the affiliated store terminal 5.

The mobile phone 3 incorporates a noncontact IC chip for electronic money card having internet connection capability and also having value processing capability, so that it can perform short distance wireless communication with the affiliated store terminal 5 to perform an addition (charge) and a subtraction (settlement) of the value.

In addition, the mobile phone 3 can also communicate with the electronic money server 2 via the Internet 72 to add and subtract the value.

Here, the value is information used as money on operation of the electronic money system, and is money information that represents an amount of a monetary value as electronic data. When the value is issued, an corresponding amount of money is collected from the user and is distributed to the affiliated store that has performed settlement in values according to the settlement amount, thus makes it possible to take correspondence between the value and a true money. Since the correspondence between the value and the true money can be taken as described above, the value can be used as a substitution for money.

Moreover, the affiliated store system is taken in the present embodiment, so that the business enterprise, namely the affiliated store that performs settlement in values by the electronic money system 1 is to previously register a shop (shops) to be a target of the settlement in values to the electronic money server 2 as the affiliated shop.

The affiliated store may be a case of a plurality of group shops (for example, department store, fast food company, family restaurant, supermarket) managed by a specific business enterprise, or may be a case of an independent retail shop, such as a private variety shop or the like.

The base station 70 can wirelessly communicate with the mobile phone 3, and connects the mobile phone 3 to the telephone network 71 or the Internet 72.

The telephone network 71 is a public network and it can mutually connect terminal devices, such as telephones, faxes, and the like. Connecting the mobile phone 3 to the telephone network 71 allows the base station 70 to provide call service to the user.

The Internet 72 is a network for connecting server devices, terminal devices, and the like. The server devices for providing various services are connected to the Internet 72. Connecting the mobile phone 3 to the Internet 72 allows the mobile phone 3 to utilize the services provided by these server devices.

For example, connecting the mobile phone 3 to the electronic money server 2 allows to charge the value to the mobile phone 3 or to perform settlement in values, based on the amount changing information that the electronic money server 2 transmits to the mobile phone 3.

The electronic money server 2 is an information processing server managed by an electronic money center, which is an organization to manage operation of the electronic money system.

The electronic money server 2 is connected to the affiliated store terminals 5, 5, 5, . . . through the communication line, and it collects information on a charge status and a settlement status of the value from these affiliated store terminals 5 as the log data, and accumulates them as history information.

It is to be noted that while the electronic money server 2 confirms the charge/settlement status of the value through the mobile phone 3 based on the log data transmitted from the affiliated store terminal 5, the value currently stored in the mobile phone 3 is a proper value as the amount of the value, and the electronic money server 2 confirms the value currently stored in the mobile phone 3 ex post facto based on the log data.

In addition, the electronic money server 2 can transmit the advertising mail to the mobile phone 3 via the Internet 72.

The advertising mail includes conditions and the like for the users to receive the cashback, such as an affiliated store at which the user can utilize cashback service, a target period, and the like.

Further, the electronic money server 2 can receive access from the mobile phone 3 via the Internet 72, and transmit the amount changing information to the mobile phone 3.

The mobile phone 3 can thereby perform charge/settlement of the value on-line, without using the affiliated store terminal 5.

Subsequently, when the user receives the cashback, the user connects the mobile phone 3 to the electronic money server 2, has the electronic money server 2 transmit the addition information for charging the value equivalent to the cashback amount, and increases the value currently stored in the mobile phone 3 using this.

Incidentally, the cashback means in the present embodiment that when the user performs settlement in values, a monetary value of a part of the settlement amount is returned to the user by charging the value.

Meanwhile, although the affiliated store shall pay financial funds of the cashback in the present embodiment, the electronic money center may pay them, or a third party such as a sponsor or the like may pay them.

Further, the cashback service may be charged on the use.

The affiliated store terminal 5 is a terminal device for noncontact IC card access installed in a register or the like of the affiliated shop, and is a special-purpose machine constituted for the electronic money business use.

The affiliated store terminal 5 is provided with a reader/writer unit that incorporates an antenna, and transmitting/receiving electric waves by this antenna makes it possible to perform short distance wireless communication with the electronic money chip of the mobile phone 3.

The affiliated store terminal 5 can perform wireless communication with the electronic money chip of the mobile phone 3 to input the amount changing information therein, charges the value to the mobile phone 3, or performs settlement by subtracting the value.

Subsequently, the affiliated store terminal 5 temporarily stores information on the processing as the log data, and transmits it to the electronic money server 2 by batch processing later.

If it is constituted so that the log data may be transmitted to the electronic money server 2 by the batch processing as described above, the affiliated store terminal 5 does not need to access the electronic money server 2 when inputting the amount changing information into the mobile phone 3, thus allowing the value processing to be performed at high speed.

It is to be noted that other than a form of transmitting the log data to the electronic money server 2 by the batch processing in this way, a configuration in which the affiliated store terminal 5 transmits the log data to the electronic money server 2 in real time to thereby perform the cashback in real time may be employed. This will be hereinafter described.

Since unique affiliated store terminal IDs are given to the affiliated store terminals 5, respectively, the electronic money server 2 can identify the affiliated store terminal 5.

Although details will be hereinafter described, the affiliated store terminal ID is associated with the affiliated store ID of the affiliated store that installs the affiliated store terminal 5, and the affiliated store ID is further associated with the advertising ID.

Thereby, the electronic money server 2 can specify the advertising ID based on the affiliated store terminal ID, and the affiliated store terminal ID constitutes advertising ID specifying information for specifying the advertising ID, in the electronic money system 1.

The affiliated store terminal 5 constitutes an amount changing information input terminal for inputting the amount changing information into the mobile phone 3.

The affiliated store server 4 is a server device that the affiliated store has, and it is arranged so as to be connectable to the electronic money server 2 via the network.

The affiliated store server 4 requests the transmission of the advertising mail to the electronic money server 2.

Although the overall configuration of the electronic money system 1 has been described so far, this is one example of the conceptual configuration and there are various modified embodiments.

For example, the affiliated store terminal 5 includes, for example, a terminal device dedicated to the settlement, which is incorporated in vending machines, and an terminal device dedicated to the charge installed in the square and the like, other than the terminal arranged in the affiliated store.

Next, the database stored in the electronic money server 2 and processing of the data stored therein will be described using FIG. 3 and FIG. 4.

As shown in FIG. 3, the electronic money server 2 is provided with a user information database 12, an affiliated store database 14, an advertisement request database 11, an advertisement destination database 13, a log database 15, and the like.

The user information database 12 is attribute information of the user that has performed use registration of electronic money service through the mobile phone 3.

These attributes are acquired from the user and stored upon service registration.

One example of a logical configuration of the user information database 12 will be shown in FIG. 4(*a*). The user information database 12 is composed of an "electronic money terminal ID", a "name", an "e-mail address", and other items.

The "electronic money terminal ID" is ID information unique to the electronic money chip of the mobile phone 3 that the user owns, and it is stored in the electronic money chip.

The electronic money server 2 can identify the mobile phone 3 and the electronic money chip embedded in the mobile phone 3, based on the electronic money terminal ID.

The "name" is a user's name.

The "e-mail address" is an e-mail address of the mobile phone 3. The electronic money server 2 can provide the user with the advertising information by transmitting the advertising mail to this e-mail address.

The "address" is a user's address. "Age" and "sex" are user's age and sex, respectively.

While the user information database 12 has been described so far, the electronic money chip constitutes a monetary terminal and the electronic money terminal ID constitutes a monetary terminal ID.

In addition, the e-mail address constitutes an advertising information destination.

For this reason, the advertising information destination and the monetary terminal are associated with each other by the user information database 12.

It is to be noted that the advertising information destination is not limited to the e-mail address of the mobile phone 3, but any destination information that the advertising information can be sent to the user may be used.

The affiliated store database 14 (FIG. 3) is attribute information of the business enterprise that has registered as the affiliated store.

These attributes are given by inputting information submitted by the business enterprise when the business enterprise has joined as the affiliated store.

One example of a logical configuration of the affiliated store database 14 will be shown in FIG. 4(*b*). The affiliated store database 14 is composed of an "affiliated store ID", an "affiliated store name", an "affiliated store terminal ID", an "address", and other items.

The "affiliated store ID" is ID information unique to the affiliated store, and it is given to the affiliated store by the electronic money center.

The "affiliated store name" is a business enterprise name of the affiliated store.

The "affiliated store terminal ID" is an affiliated store terminal ID of the affiliated store terminal 5 installed in the affiliated store.

For the affiliated store that installs a plurality of affiliated store terminals 5, the affiliated store terminal IDs of all the plurality of affiliated store terminals 5 are associated with the affiliated store ID. In the example shown in the figure, a plurality of affiliated store terminals 5 "8796, 7896, 1423 . . ." are associated with the affiliated store of the affiliated store ID "765".

The "address" is an address of the head office of the affiliated store.

The advertisement request database 11 (FIG. 3) is a database that stores advertisement request information received by the electronic money server 2 from the affiliated store server 4.

One example of a logical configuration of the advertisement request database 11 will be shown in FIG. 4(c). The advertisement request database 11 is composed of an "advertising ID", an "affiliated store ID", "advertising information", "target information", a "reception date", a "cashback condition", a "cashback amount", and other items.

The "advertising ID" is ID information for specifying an advertisement transmitted to the user by the advertising mail, and it is given by the electronic money server 2. As described above, the electronic money server 2 can identify the advertisement to be a cashback target by giving the ID information for every advertisement.

The "affiliated store ID" is the affiliated store ID of the affiliated store that has made an advertisement request.

The "advertising information" is data corresponding to a manuscript in which the advertising content wanted to be provided to the user by the advertising mail is described, and it is composed of character data, image data, and the like. The electronic money server 2 creates the advertising mail using this advertising information.

The "target information" is information for narrowing down the target to which the advertising mail is transmitted, and it is specified by the affiliated store server 4.

The attribute information of the user, for example, "address is within Tokyo, male", "female of 20 to 30 years old", or the like, to which the advertising mail is transmitted can be used as the target information, and the destination of the advertising mail can thereby be set according to an advertisement article.

The "reception date" is a date when the electronic money server 2 receives the advertisement request from the affiliated store server 4, and it is recorded by the electronic money server 2.

The "cashback condition" is a condition for setting an activity to be the target of the cashback in the user's purchasing activities.

The "cashback condition" may be set as "purchase of 5,000 yen or more from 10:00 to 12:00 on February 25", or the like, for example. A target article and the like may be set as the cashback condition, other than the target time zone and the target amount.

The affiliated store can freely set the cashback condition based on the "cashback condition".

The "cashback amount" is an item for setting the cashback amount, and it is transmitted from the affiliated store server 4. For example, it can be set as "10% of settlement amount", "100 yen across-the-board", or the like.

It can also be set with a conditional expression as "100 yen back in the case of ~, and 200 yen back in the case of ~", or the like.

The advertisement destination database 13 (FIG. 3) is a database that stores the destination for transmitting the advertising mail, and is the database in which the electronic money server 2 refers to the user information database 12 to narrow down the information corresponding to the "target information" in the advertisement request database 11.

One example of a logical configuration of the advertisement destination database 13 will be shown in FIG. 4(d).

The advertisement destination database 13 is composed of an "advertising ID", an "electronic money terminal ID", and other items, wherein the advertising ID and the electronic money terminal ID are associated with each other.

Namely, in the advertisement destination database 13, the advertising ID, and the electronic money terminal ID of the user's mobile phone 3 narrowed down as the destination of this advertisement are associated with each other.

If there are a plurality of destination users, the electronic money terminal IDs of these user's mobile phones 3 are stored in the "electronic money terminal ID", and the advertising ID and the electronic money terminal IDs are associated with each other.

Thus, the electronic money server 2 is provided with associating means for associating the monetary terminal ID associated with the advertising information destination (e-mail address) to which the advertising information is transmitted, and the advertising ID of the advertising information with each other to store them in storage means.

The electronic money server 2 searches the advertising ID in the advertisement request database 11 to acquire the advertising information to be used for the advertising mail, and searches the electronic money terminal ID in the user information database 12 to acquire the e-mail address of the advertising mail destination.

The log database 15 (FIG. 3) is a database in which the log data transmitted from the affiliated store terminal 5 is stored. The data stored in the log database 15 is the log data transmitted from the affiliated store terminal 5.

One example of a logical configuration of the log database 15 will be shown in FIG. 4(e). The log database 15 is composed of an "affiliated store terminal ID", an "electronic money terminal ID", a "charge amount", a "settlement amount", a "date", and other items.

The "affiliated store terminal ID" is the affiliated store terminal ID of the affiliated store terminal 5, which is a source of the log data. The "electronic money terminal ID" is an electronic money terminal ID of the electronic money chip incorporated in the mobile phone 3 to which the affiliated store terminal 5 has performed charge/settlement.

This electronic money terminal ID is obtained by reading the electronic money terminal ID from the electronic money chip and recording it on the log data, when the affiliated store terminal 5 inputs the amount changing information into the mobile phone 3.

The "charge amount" is a charge amount when the affiliated store terminal 5 inputs the addition information into the mobile phone 3 to perform the charge. No information is inputted when the affiliated store terminal 5 performs settlement through the mobile phone 3.

The "settlement amount" is a settlement amount when the affiliated store terminal 5 inputs the subtraction information into the mobile phone 3 to perform settlement. No information is inputted when the affiliated store terminal 5 performs charge to the mobile phone 3.

The "date" is a date when the affiliated store terminal 5 inputs the amount changing information into the mobile phone 3.

Returning again to FIG. 3, the electronic money server 2 checks the advertisement destination database 13 and the log database 15 from the log database 15 to confirm whether or not the user of the advertising mail destination has performed the purchasing activity to be the target of the cashback at an advertiser's affiliated store, and if it can be confirmed, the electronic money server 2 calculates the cashback amount and also transmits the cashback mail to this user's mobile phone 3. Incidentally, a checking method thereof will be hereinafter described in details.

The cashback mail includes a URL for connecting to a cashback website that is established by the electronic money server 2 in order to perform the cashback, and the user can access the cashback website using the cashback mail to receive the cashback service.

More detailedly, when the access from the mobile phone 3 to the cashback website is received, the electronic money server 2 creates the addition information for adding the value equivalent to the cashback amount to be returned to this mobile phone 3, and transmits it to the mobile phone 3.

The value equivalent to the cashback is charged using this addition information, in the mobile phone 3.

FIG. 5 is a view showing one example of a hardware configuration of the electronic money server 2.

The electronic money server 2 is constituted by a CPU (Central Processing Unit) 21, a ROM (Read Only Memory) 22, a RAM (Random Access Memory) 23, a communication control unit 24, a storage unit 27, an input/output unit 25, and the like, wherein they are connected to each other by a bus line 26.

The CPU 21 not only performs various information processing such as creation/transmission of the advertising mail, execution of cashback processing, and the like according to a predetermined program, but also performs control of the whole electronic money server 2, and the like.

The ROM 22 is a read-only memory, and a fundamental program, parameters, and the like for operating the electronic money server 2 are stored therein.

The RAM 23 is a readable and writable memory, and it provides a working memory of the CPU 21, and loads and stores a program and data stored in the storage unit 27.

The communication control unit 24 is a function unit that communicates with the mobile phone 3 via the Internet 72 and the base station 70, and communicates with the affiliated store terminal 5 via the communication line.

The CPU 21 can transmit the advertising mail and the amount changing information to the mobile phone 3 via the communication control unit 24, and can receive the log data from the affiliated store terminal 5.

The storage unit 27 is constituted by, for example, a hard disk, other nonvolatile memories, and the like, and it is constituted by a program storage unit 28 that stores various programs, a data storage unit 29 that stores data, and the like.

The program storage unit 28 stores an OS which is a fundamental program for operating the electronic money server 2, an advertising mail transmitting program for receiving the advertising information from the affiliated store server 4 to receive commission of the advertisement, and creating/transmitting the advertising mail, a cashback program for receiving the log data from the affiliated store terminal 5 to perform checking processing, and performing the cashback to the mobile phone 3, and other programs.

The data storage unit 29 stores the advertisement request database 11, the user information database 12, the advertisement destination database 13, the affiliated store database 14, the log database 15, and other databases.

The input/output unit 25 is constituted so as to be connectable to, for example, a display unit such as a display or the like, and an input device such as a keyboard, a mouse, or the like, and is used in the cases of maintenance and checks for the electronic money server 2, version up for the program, and the like.

FIG. 6 is a block diagram showing one example of a functional configuration of the mobile phone 3.

As shown in FIG. 6, the mobile phone 3 is constituted by a telephone terminal unit 31 that exhibits a function as the mobile phone connectable to the Internet, an electronic money terminal unit 35 that is constituted by the electronic money chip formed by the noncontact IC chip and exhibits value processing capability, and an interface unit that connects both of them.

The telephone terminal unit 31 can perform wireless communication with the base station 70, and connect to the telephone network 71 (when talking over the phone) or the Internet 72 (when accessing the electronic money server 2) via the base station 70.

By the telephone terminal unit 31, the mobile phone 3 can receive the advertising mail from the electronic money server 2, and display the advertising information on the display of the mobile phone 3.

An application 32 is installed in the telephone terminal unit 31. The application 32 is an application for communicating with the electronic money terminal unit 35 to provide various services on the electronic money, and it is provided with a relay unit 33 for accessing the electronic money terminal unit 35 via the interface unit 34.

The application 32 has functions to present the user the information stored in the electronic money terminal unit 35, such as accessing the electronic money terminal unit 35 and displaying the electronic money terminal ID, the balance of the value, the log data accompanying the value processing, and the like on the display.

The application 32 also performs communication with the electronic money server 2 via the Internet.

As a result, the electronic money terminal ID, the balance of the value, and the like, which are stored in the electronic money terminal unit 35 can be transmitted to the electronic money server 2, and the amount changing information transmitted from the electronic money server 2 can be inputted into the electronic money terminal unit 35.

Although not illustrated, the electronic money terminal unit 35 is constituted using the noncontact IC chip in which devices, such as a CPU, a ROM, a RAM, an EEPROM, a high frequency circuit, and the like are formed, and the antenna for communicating with the reader/writer, and a value processing unit 36 and a storage unit 37 are formed by executing a predetermined program in the CPU.

The value processing unit 36 can not only communicate with the electronic money server 2 via the interface 34, but also communicate with the affiliated store terminal 5 by short distance wireless communication using the antenna.

The value processing unit 36 outputs the electronic money terminal ID and the value balance to these external communication destinations, and receives the amount changing information from the external communication destinations to update the value balance stored in the storage unit 37.

The storage unit 37 stores the electronic money terminal ID, the value balance, the log data, and the like.

FIG. 7 is a view showing one example of the advertising mail displayed on the display of the mobile phone 3.

The character data displayed in the advertising mail 41 is composed using the advertising information that the affiliated store server 4 has transmitted to the electronic money server 2.

A title of the advertising mail 41 is described as "Good news from ABC department store", so that the user can recognize that the advertising mail 41 is an advertising mail from the ABC department store.

A body copy of the advertising mail 41 is described as "If you spend 5000 yen or more with electronic money between 10:00 to 12:00 on February 25, 10% thereof will be returned as cashback. The cashback will be performed through the cashback mail later.".

According to this description, the user can recognize that there are three conditions to perform the cashback, namely, (a) the time zone for shopping is between 10:00 to 12:00 on February 25, (b) a total amount of shopping is 5000 yen or more, and (c) shopping with electronic money, and the cashback amount is 10% of the amount of shopping.

As described above, the condition for performing the cashback can be described in the advertising mail 41, and this condition is used as a condition upon checking a cashback target person by the electronic money server 2 later.

FIG. 8 is a view showing one example of the cashback mail displayed on the display of the mobile phone 3.

If the cashback condition is satisfied, the electronic money server 2 transmits the cashback mail to the mobile phone 3, and the user can perform the charge to the mobile phone 3 using this cashback mail to thereby receive the cashback.

The cashback mail is composed of a cashback notice 43, a cashback URL 44, a cancellation URL 45, and an expiration date area 46.

The cashback notice 43 guides the user to the cashback, and the detailed content of the cashback is displayed.

In the example shown in FIG. 8, it is described in the cashback notice 43 that "Notice of the cashback from ABC department store", and the user can recognize a subject which performs the cashback (here, ABC department store).

Further, it is described in the cashback notice 43 that "Your cashback amount is 500 yen. When you execute the cashback, please click URL of the "cashback". When you perform the cashback later, please click "cancellation".

Thereby, the user can recognize that the cashback amount is 500 yen, and can further recognize that the "cashback" URL may be clicked to execute the cashback, and the "cancellation" URL may be clicked when performing the cashback later.

As described above, the subject to perform the cashback, the cashback amount, the cashback execution operating instruction, and the like are displayed on the cashback notice 43.

The cashback URL 44 and the cancellation URL 45 are URLs for connecting to a site for cashback and a site for cancellation, which are provided in the electronic money server 2, respectively, and are displayed so as to be selectable by the user's click.

The user can select either of them using input means, such as a function key, ten-key, or the like of the mobile phone 3, and when performing the cashback, the user clicks the cashback URL 44, and when not performing settlement, the user click the cancellation URL 45.

When either of the cashback URL 44 and the cancellation URL 45 is clicked, the mobile phone 3 will connect the mobile phone 3 to the electronic money server 2 with a clicked URL to thereby establish the communication line.

The cashback URL 44 is composed of the URL of the site for cashback of the electronic money server 2, and a parameter for specifying the target of the cashback. When the user clicks the cashback URL 44, this parameter will be sent to the site for cashback.

As the parameter for specifying the target of the cashback, there is a cashback ID, which is set for every cashback application by the electronic money server 2, for example.

More detailedly, when the electronic money server 2 checks the advertisement destination database 13 (FIG. 3) and the log database 15 to thereby specify users and amounts to be the target of the cashback, it determines them as cashback target items to give the cashback IDs.

By this cashback ID, the electronic money server 2 can recognize which checking results the cashback depends on.

The cancellation URL 45 is composed of the URL of the site for cancellation of the electronic money server 2, and a parameter for specifying the target of the cashback.

An expiration date of the cashback is displayed in the expiration date area 46. If the expiration date expires, the electronic money server 2 will not receive a request of the cashback by this cashback mail.

Next, a procedure of providing the cashback service for the user will be described using a flow chart shown in FIG. 9.

It is to be noted that the following information processing is performed according to a predetermined program by the CPU of the telephone terminal unit 31 and the CPU of the electronic money terminal unit 35, relating to the mobile phone 3, and is performed by the CPUs according to a predetermined program, relating to the electronic money server 2 and the affiliated store server 4, respectively.

First, although not illustrated, the affiliated store server 4 requests transmission of the advertising mail from the electronic money server 2.

The affiliated store server 4 performs this processing by transmitting advertisement request data to the electronic money server 2.

The information included in this advertisement request data is composed of respective items (excluding "advertising ID") shown in FIG. 4(*c*).

The electronic money server 2 receives the advertisement request data, and gives the advertising ID thereto and stores it in the advertisement destination database 13 to thereby register the request from the affiliated store (Step 10).

When receiving the transmission request of the advertising mail, the electronic money server 2 narrows down target users to which the advertising mail will be transmitted (Step 15).

In order to perform this processing, the electronic money server 2 checks the "target information" stored in the advertisement destination database 13, and the user's attribute stored in the user information database 12, and it specifies a user having the attribute coincident with the target information.

Subsequently, the electronic money server 2 extracts the electronic money terminal ID registered to this user, and associates it with the advertising ID to store them in the advertisement destination database 13 (associating means).

Next, the electronic money server 2 creates an advertising mail using the "advertising information" stored in the advertisement request database 11, and associates this with the advertising ID to store them therein.

The electronic money server 2 subsequently specifies the electronic money terminal ID associated with this advertising ID in the advertisement destination database 13, and further specifies the e-mail address associated with this electronic money terminal ID in the user information database 12.

Subsequently, the electronic money server 2 transmits the advertising mail created previously to this e-mail address) (Step 20).

Thus, the electronic money server 2 is provided with advertisement transmitting means for transmitting the advertising information to the advertising information destination.

The mobile phone 3 receives the advertising mail from the electronic money server 2, and informs the user about an incoming call by a beep sound or the like (Step 25).

The user operates the mobile phone 3, displays the advertising mail on the display, and confirms the advertising content.

The user confirms the advertisement and purchases the article at the affiliated store to be the advertising target.

In this case, the user causes the mobile phone 3 and the affiliated store terminal 5 to perform short distance wireless communication by holding the mobile phone 3 over the reader/writer of the affiliated store terminal 5, and performs settlement processing by the value stored in the mobile phone 3 (Step 30, Step 35).

More detailedly, the affiliated store terminal 5 inputs into the mobile phone 3 the subtraction information which reduces the value equivalent to a purchasing price by short distance radio communication, and the mobile phone 3 reduces the value equivalent to the settlement amount using the subtraction information inputted from the affiliated store terminal 5.

The affiliated store terminal 5 stores information on this settlement processing as the log data, and will transmit it to the electronic money server 2 by the batch processing later (Step 40).

The electronic money server 2 receives the log data from the affiliated store terminal 5, and stores it in the log database 15.

The electronic money server 2 checks the advertisement destination database 13 and the log database 15, and specifies an electronic money terminal ID that is the target of the cashback (Step 45). This step will be hereinafter described in details.

Next, the electronic money server 2 acquires from the user information database 12 the e-mail address associated with the electronic money terminal ID that is the target of the cashback, and transmits the cashback mail to this e-mail address (Step 50).

Subsequently, the mobile phone 3 receives the cashback mail from the electronic money server 2, and notifies the user of e-mail reception (Step 55).

When the user confirms this cashback mail and requests the charge for the cashback, the mobile phone 3 will connects to the site for cashback of the electronic money server 2 to request the charge (Step 60).

The electronic money server 2 transmits the addition information for adding the value equivalent to the cashback amount to the mobile phone 3, based on the request of the charge by the mobile phone 3. The mobile phone 3 performs the charge processing using this addition information (Step 65). It is to be noted that when the electronic money server 2 performs the cashback to the mobile phone 3, it confirms whether or not the cashback is within the expiration date written in the cashback mail.

The cashback in values is performed to the mobile phone 3 according to the above procedure.

Next, the log checking processing at Step 45 will be described using a flow chart shown in FIG. 10.

The following processing will be performed by the CPU of the electronic money server 2 according to the cashback program.

First, the electronic money server 2 confirms a transmission date of the advertising mail (Step 100).

Next, it extracts the log data after this date from the log database 15 (Step 105).

The reason is that since the user performs consumption that is the target of the cashback after transmitting the advertising mail, the log data that is the target of the cashback does not exist in the log data before transmitting the advertising mail.

As described above, the electronic money server 2 shall determine a before-and-after relation between an advertisement transmission point when the advertising mail is transmitted, and an amount changing point when the settlement in values of mobile phone 3 is performed, and the log data whose amount information changing point is before the advertisement transmission point shall not be coincident in the check.

Moreover, for example, when the advertising mail is transmitted to a predetermined region, extraction conditions can be set according to an individual situation, such as further extracting the log data that is after the advertising mail transmission and is transmitted from the affiliated store terminal 5 in the region.

Next, the electronic money server 2 refers to the affiliated store terminal ID included in the extracted log data in the affiliated store database 14 to specify the affiliated store ID associated with the affiliated store terminal 5. Further, it refers to this specified affiliated store ID in the advertisement destination database 13 to specify the advertising ID associated with this affiliated store ID. Thus, the electronic money server 2 can specify the advertising ID corresponding to the affiliated store terminal ID (Step 110).

Next, the electronic money server 2 checks a combination (second group) between the advertising ID specified using the log data and the electronic money terminal ID, and a combination (second group) between the advertising ID stored in the advertisement destination database 13 and the electronic money terminal ID, and specifies combinations coincident with each other (Step 115).

The electronic money terminal ID included in the coincident groups will be a candidate to perform the cashback.

Next, the electronic money server 2 refers to the cashback condition of the advertisement request database 11 to confirm whether or not the log data relating to the electronic money terminal ID specified at Step 115 satisfies the condition of the cashback (Step 120).

For example, in the example shown in FIG. 4, since the cashback condition is set that "Settlement date is on February 25, settlement time is from 10:00 to 12:00, and settlement amount is 5000 yen or more" in the advertisement request database 11, and the settlement date is at 10:30 on February 25, and the settlement amount is 5000 yen in the log database 15, the cashback condition is satisfied.

Returning again to FIG. 10, the electronic money server 2 calculates the cashback amount of the electronic money terminal ID that satisfies the cashback condition with reference to the cashback amount of the advertisement request database 11 (Step 125).

For example, in the example shown in FIG. 4, since the cashback amount is 10% of the settlement amount, the cashback is calculated as 500 to the electronic money terminal ID whose settlement amount is 5000 yen shown in the log database 15.

Thus, the electronic money server 2 is provided with change amount receiving means for receiving a changed amount (here, settlement amount) changed through the mobile phone 3 according to the amount changing information that the affiliated store terminal 5 inputs into the mobile phone 3, and prescribed amount calculating means for calculating a prescribed amount (cashback amount) using this received amount.

Although the cashback is performed using the mobile phone 3 in the electronic money system 1 described above, the cashback may be performed using an electronic money card which incorporates the electronic money chip.

In this case, the advertising mail destination may be an arbitrary e-mail address (it can be browsed with a personal computer or the like) specified by, for example, the user, and the electronic money terminal ID of the electronic money chip incorporated in the electronic money card is used as the electronic money terminal ID.

Subsequently, the charge in the cashback can be performed by the computer equipped with the reader/writer, for example.

The user sets the electronic money card to the reader/writer, and accesses the site for cashback of the electronic money server 2.

When the line is established, the electronic money server 2 will establish a communication line between the cashback site and the electronic money card, and transmit the addition information for performing the charge equivalent to the cashback amount to the electronic money card.

In the electronic money card, the electronic money chip charges the value equivalent to the cashback amount using this addition information.

Incidentally, the mobile phone 3 mounting the GPS (Global Positioning System) has come to be used these days.

Using the GPS makes it possible to transmit the advertising mail according to the user's current position.

For example, a user's current existing area to which the advertising mail is to be transmitted is previously submitted from the affiliated store as the target information.

Subsequently, the electronic money server 2 receives the user's current position from the mobile phone 3, and transmits the advertising mail to the user that exists in the area specified by the affiliated store. Thereby, the user can obtain the advertisement according to a destination or the like.

When the mobile phone 3 does not mount the GPS, the current position may be manually transmitted to the electronic money server 2 by the user.

In addition, although a qualification to be the cashback target is obtained when the user purchases the article in values according to the cashback condition in the present embodiment, the cashback without the purchase of the article is also possible by conducting a campaign that "if you come to the store, the value equivalent to 100 yen can be charged for free", for example.

Further, since the electronic money server 2 transmits the cashback mail to the mobile phone 3 after analyzing the log data transmitted by the batch processing, a time difference occurs between the purchase of the article and implementation of the cashback in the electronic money system 1, but it is also possible to perform the cashback in real time when the user performs settlement in values of the mobile phone 3 by connecting the affiliated store terminal 5 to the electronic money server 2 upon performing charge/settlement.

In this case, the affiliated store terminal 5 makes settlement in values of the mobile phone 3, and also transmits the log data relating to the processing with the mobile phone 3 to the electronic money server 2.

Subsequently, the electronic money server 2 receives the log data from the affiliated store terminal 5, and determines whether or not this settlement is the cashback target.

If it is the cashback target, the cashback amount is transmitted to the affiliated store terminal 5, but if it is not the cashback target, a notice to that effect is transmitted to the affiliated store terminal 5.

When the cashback amount is transmitted from the electronic money server 2, the affiliated store terminal 5 inputs the addition information equivalent to this amount into the mobile phone 3. Thereby, the mobile phone 3 can receive the cashback subsequent to the settlement.

Further, it may be configured such that the electronic money server 2 and the affiliated store terminal 5 are always connected to each other through the network to create the amount changing information by the electronic money server 2.

In such a mode, the affiliated store terminal 5 receives the input of the settlement amount and the amount to be charged, and transmits them to the electronic money server 2. Subsequently, the electronic money server 2 creates the amount changing information corresponding to this amount, and transmits it to the affiliated store terminal 5. The affiliated store terminal 5 inputs this amount changing information into the electronic money server 2.

In such a mode, it is possible to make settlement of the value of the mobile phone 3 by the amount in which the value equivalent to the cashback amount is previously discounted. The cashback in this case is performed by the following procedure, for example.

(1) The user sets the mobile phone 3 to the affiliated store terminal 5, and a person in charge of the affiliated store terminal 5 inputs the settlement amount into the affiliated store terminal 5.

(2) The affiliated store terminal 5 transmits to the electronic money server 2 the electronic money terminal ID of the mobile phone 3, the affiliated store ID, and the settlement amount.

(3) The electronic money server 2 receives these pieces of information, and confirms whether or not the settlement is the cashback target. Subsequently, if it is the cashback target, the electronic money server 2 creates the subtraction information of the amount obtained by increasing the cashback amount to the settlement amount, and transmits it to the affiliated store terminal 5. When it is not the cashback target, the electronic money server 2 creates the subtraction information equivalent to the settlement amount and transmits it to the affiliated store terminal 5.

(4) The affiliated store terminal 5 inputs into the mobile phone 3 the subtraction information transmitted from the electronic money server 2. Subsequently, the mobile phone 3 reduces the value using this subtraction information.

In this processing, the settlement can be made at the amount to which the cashback amount is previously added.

Moreover, the cashback is performed using the cashback mail in the present embodiment, but this is one example, and it is also possible to perform the cashback, for example, from a service site that the electronic money server 2 has set up for user service, other than this. In this case, the cashback can be performed without using the e-mail.

The cashback in this case is performed by the following procedure, for example.

(1) The user accesses the service site using the mobile phone 3, and logs in to the service site using user specifying information, such as a user ID, a password, or the like.

(2) The electronic money server 2 specifies the user that has logged in by the user specifying information. Subsequently, if there is the cashback to be performed to this user, the electronic money server 2 notifies the user that the cashback is available, such that "Mr./Ms. Yamada, cashback equivalent to 500 yen is available from ABC department store. Please click an execution button, when you execute the cashback", or the like, at the service site.

(3) The user clicks the execution button at the service site. The electronic money server 2 then transmits the addition information equivalent to the cashback amount to the mobile phone 3.

(4) The mobile phone 3 receives this addition information from the service site, and adds the value using this. Thereby, the user can receive the cashback.

Following effects can be obtained by the present embodiment described above.

(1) If the user purchases an article according to the cashback condition in the advertising mail after receiving the advertising mail, the user can receive the cashback.

(2) Upon receiving the cashback, registration or the like is not required, and the user should just purchase the article only according to the cashback condition in the advertising mail.

(3) The affiliated store can attempt to attract customers by providing the user with the cashback.

(4) The affiliated store may just perform the cashback to the user that has actually purchased the article, and may pay cashback financial funds only for a range where the advertising mail has exhibited the effects.

(5) The affiliated store does not need to perform particular works upon performing the cashback, such as registering the user of the cashback target, for example.

(6) Since it is achievable only by incorporating a module for performing the checking processing and the like into the conventional electronic money server 2, an existing system configuration can be utilized.

(7) Use of electronic money is promoted.

Next, a modified embodiment of the present embodiment will be described.

FIG. 11 is a network diagram showing one example of a configuration of an electronic money system 1a in accordance with a modified embodiment of the present embodiment. The same symbol is given to the same component as that of the electronic money system 1 of the present embodiment described previously.

In the electronic money system 1a, maker servers 6, 6, 6, . . . installed by the maker of the article are arranged so as to be connectable to the electronic money server 2.

The maker server 6 is a server device installed by the business enterprise (maker) that is manufacturing the article sold at the affiliated shop.

Although the user can receive the cashback when purchasing the article in values at the cashback target affiliated shop which is the target of the advertising mail, in the embodiment described previously, the user can receive the cashback when purchasing a cashback target article in values, in the present modified embodiment, The electronic money server 2 transmits to the user the advertising mail that advertises a specific product, such that "Customers that purchase, for example, a deluxe chocolate of ○X company in electronic money can receive the cashback of 100 yen".

Subsequently, the electronic money server 2 stores an article ID in the advertisement request database 11 (FIG. 4), and associates the advertising ID and the article ID with each other.

Generally, retail chain stores, such as a convenience store and the like, individually record purchased articles as an individual sales log (for example, POS log), using, for example, a POS system (Point Of Sales System) or the like.

The affiliated store is performing inventory control, marketing, and the like, using the individual sales log.

The electronic money server 2 receives the individual sales log from the affiliated store terminal 5 by the batch processing.

The article IDs and the number of sold articles, the sold date, the electronic money terminal IDs if the mobile phone 3 performs settlement in values, and the like are recorded in the individual sales log.

The electronic money server 2 can obtain the advertising ID corresponding to the article ID included in the individual sales log by the advertisement request database 11. The article ID constitutes the advertising ID specifying information for specifying the advertising ID.

Subsequently, the electronic money server 2 checks a combination of the monetary terminal ID of the user that has transmitted the advertising mail and the advertising ID, and a combination of the monetary terminal ID acquired using the individual sales log and the advertising ID.

When there are monetary terminal IDs that are coincident with each other as a result of the check, the electronic money server 2 performs the cashback to the monetary terminal ID.

The electronic money server 2 stores the article ID to be the cashback target and a maker ID for specifying the maker while associating them with each other, and can also transmit information on a sales situation of the article corresponding to the article ID, to the maker server 6 corresponding to this maker ID.

The information provided to the maker server 6 can be composed of, for example, the article ID, the number of sales of the article, the attribute (age, sex, and the like) of the user that has purchased the article, the sold date, the affiliated shop that has sold the article, and the like.

It is to be noted that the information provided to the maker is classified into ranks according to the level of detail of the information, for example, rank 1 includes sex and age, ranks 2 includes residential area and occupation, ranks 3 includes address, name, and contact address, and the like, and information in the rank to which the user has previously given the approval is provided to the maker side to the extent permitted by law.

Using the electronic money system 1a constituted as described above allows the maker to conduct a campaign of the article of its company.

BRIEF DESCRIPTION OF THE DRAWINGS

FIG. 4 is a view for explaining a logical configuration of the database;

Figure 1:
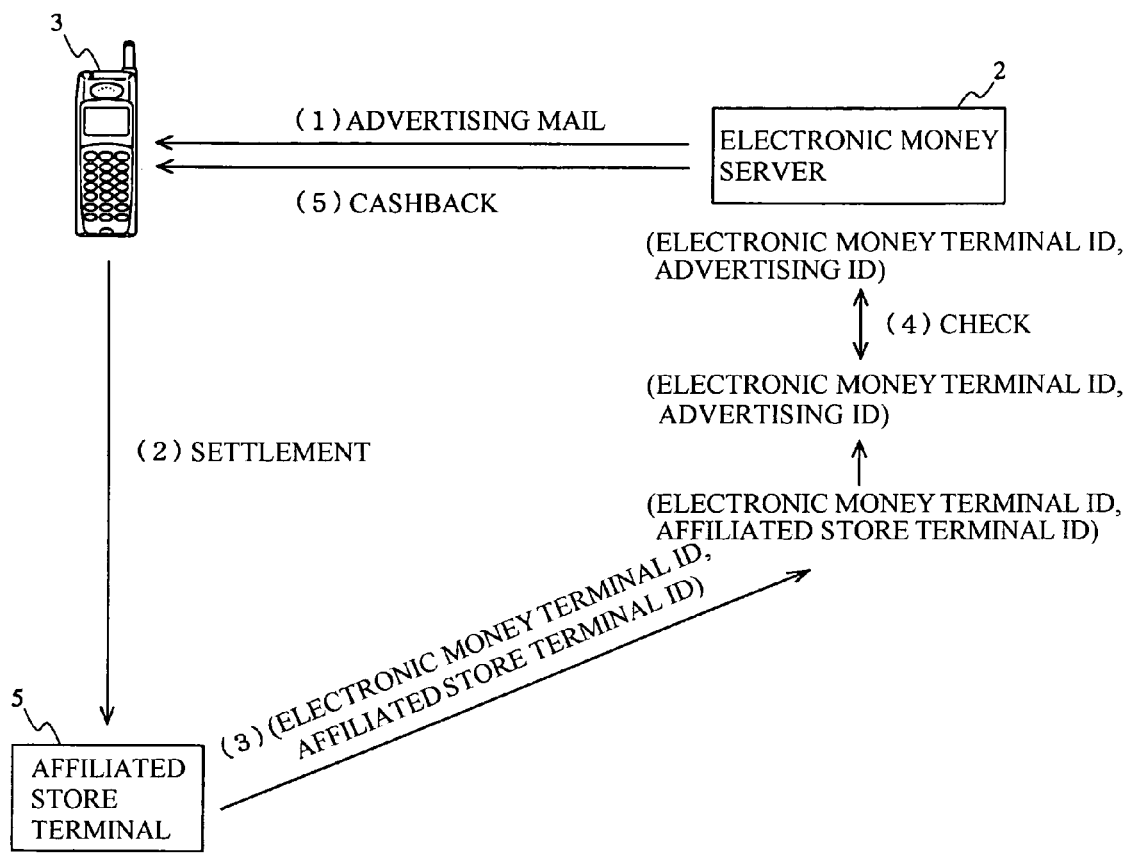
FIG. 1 is a conceptual diagram for explaining a summary of the present embodiment.
Figure 2:
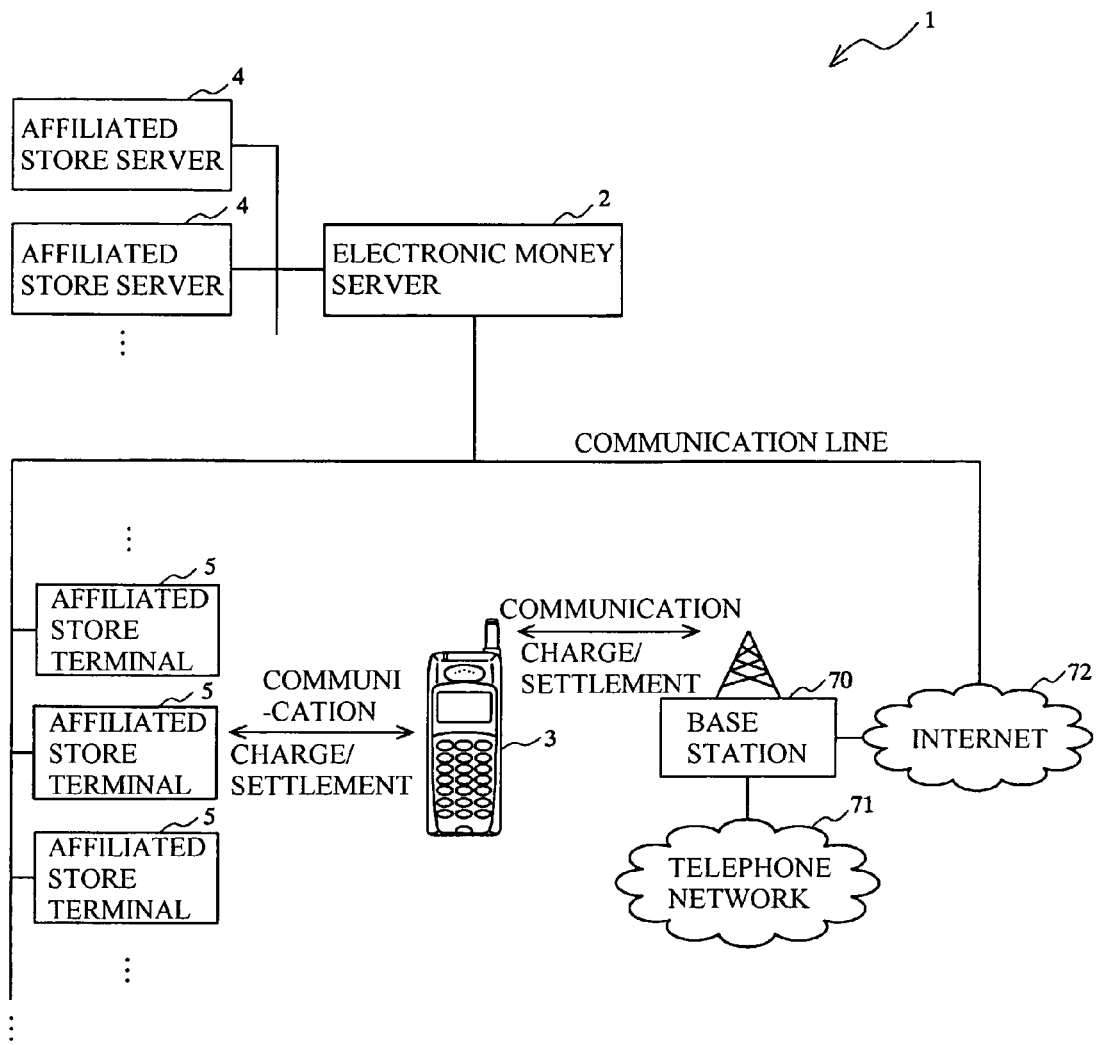
FIG. 2 is a network diagram showing one example of a configuration of an electronic money system of the present embodiment.
Figure 3:
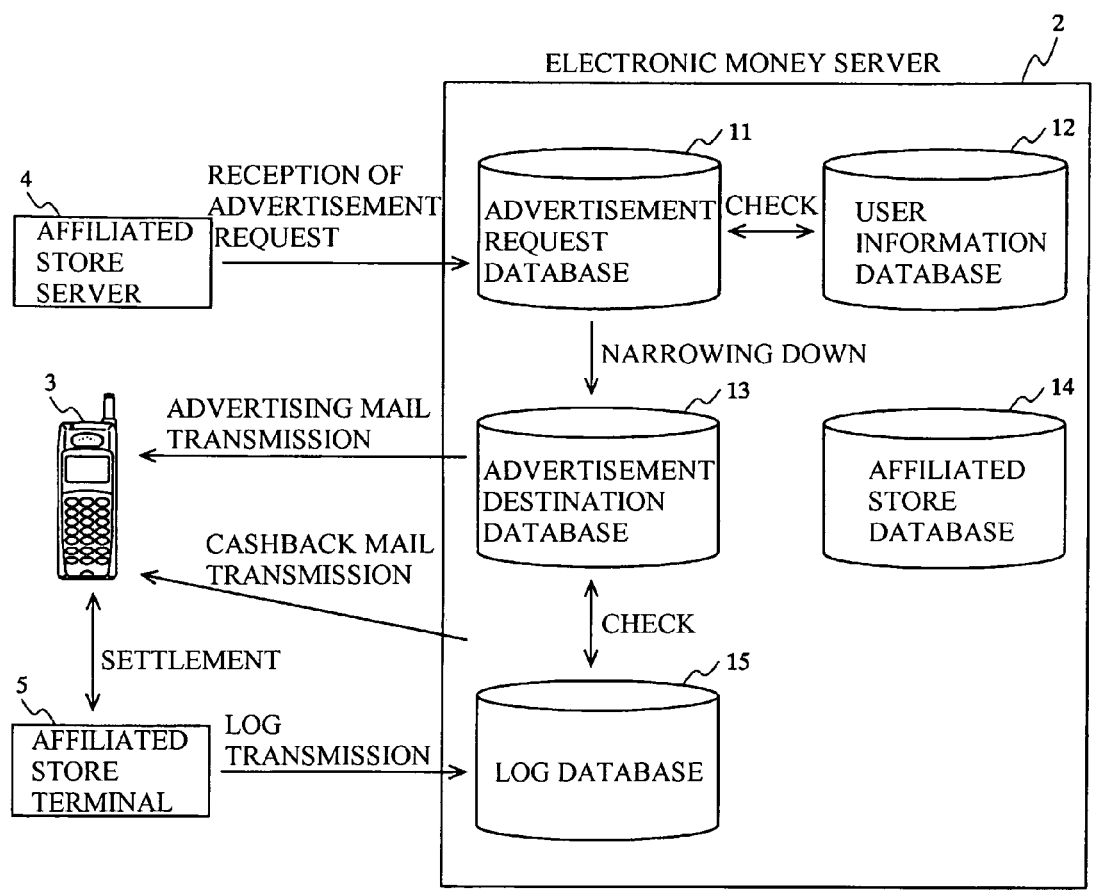
FIG. 3 is a view for explaining a database and the like that an electronic money server manages.
Figure 5:
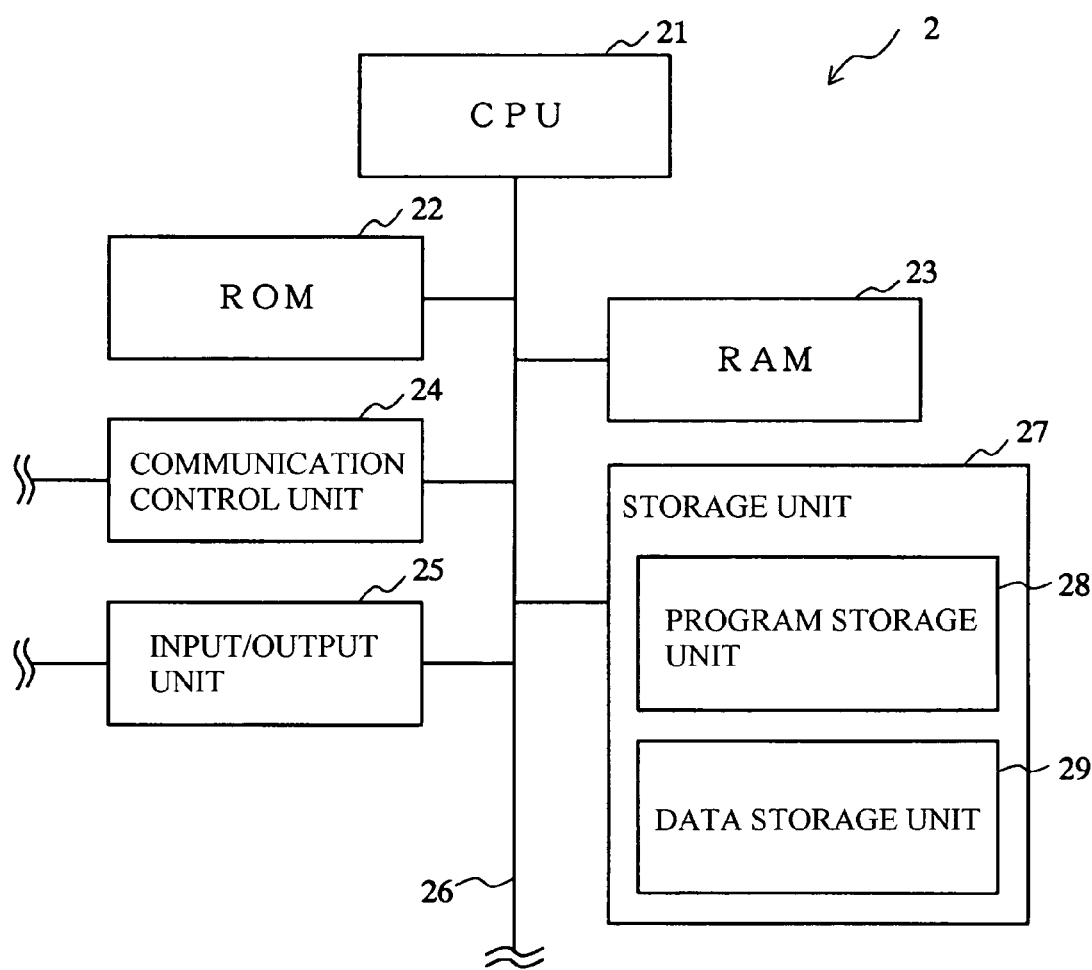
FIG. 5 is a view showing one example of a hardware configuration of the electronic money server.
Figure 6:
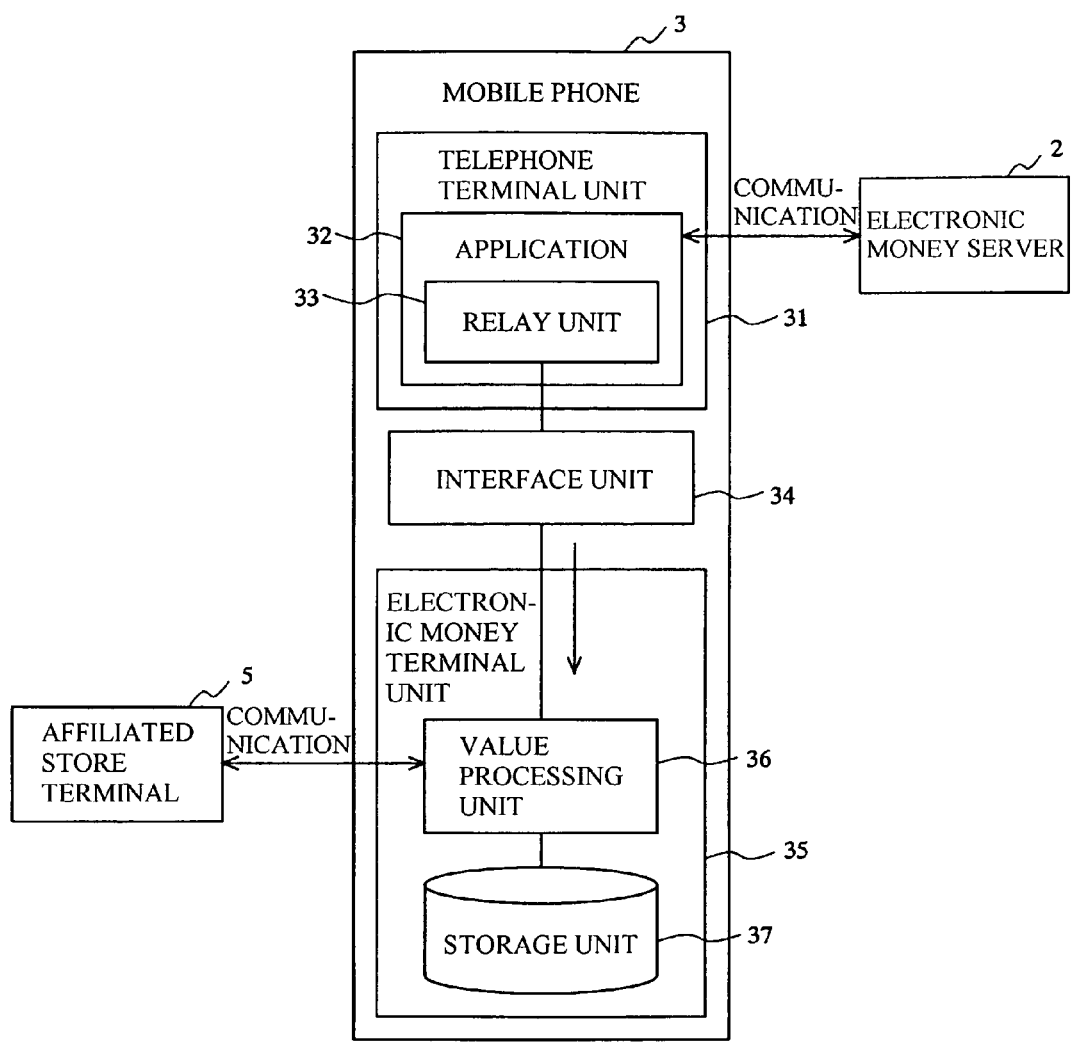
FIG. 6 is a block diagram showing one example of a functional configuration of a mobile phone.
Figure 7:
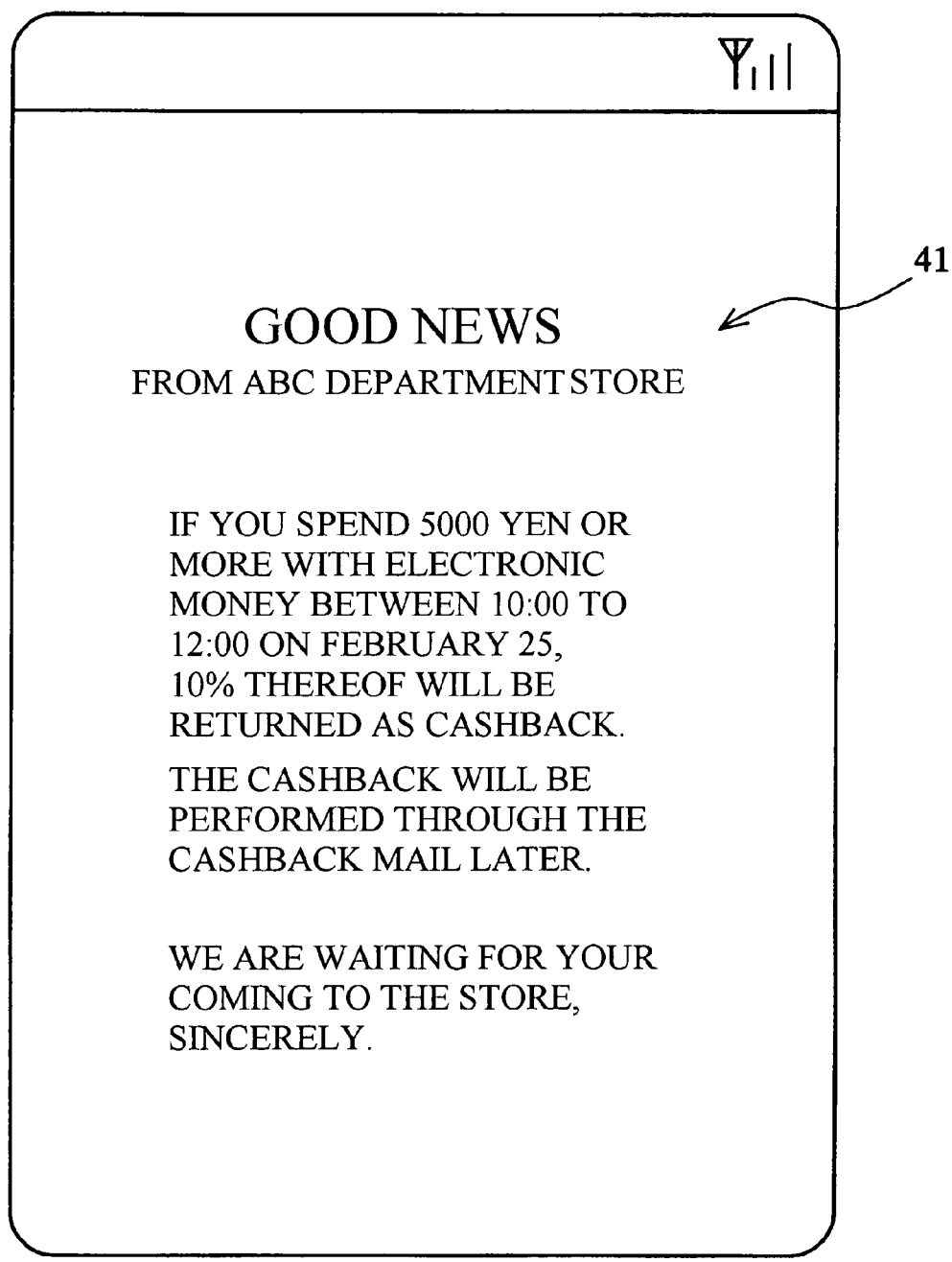
FIG. 7 is a view showing one example of an advertising mail displayed on a display of the mobile phone.
Figure 8:
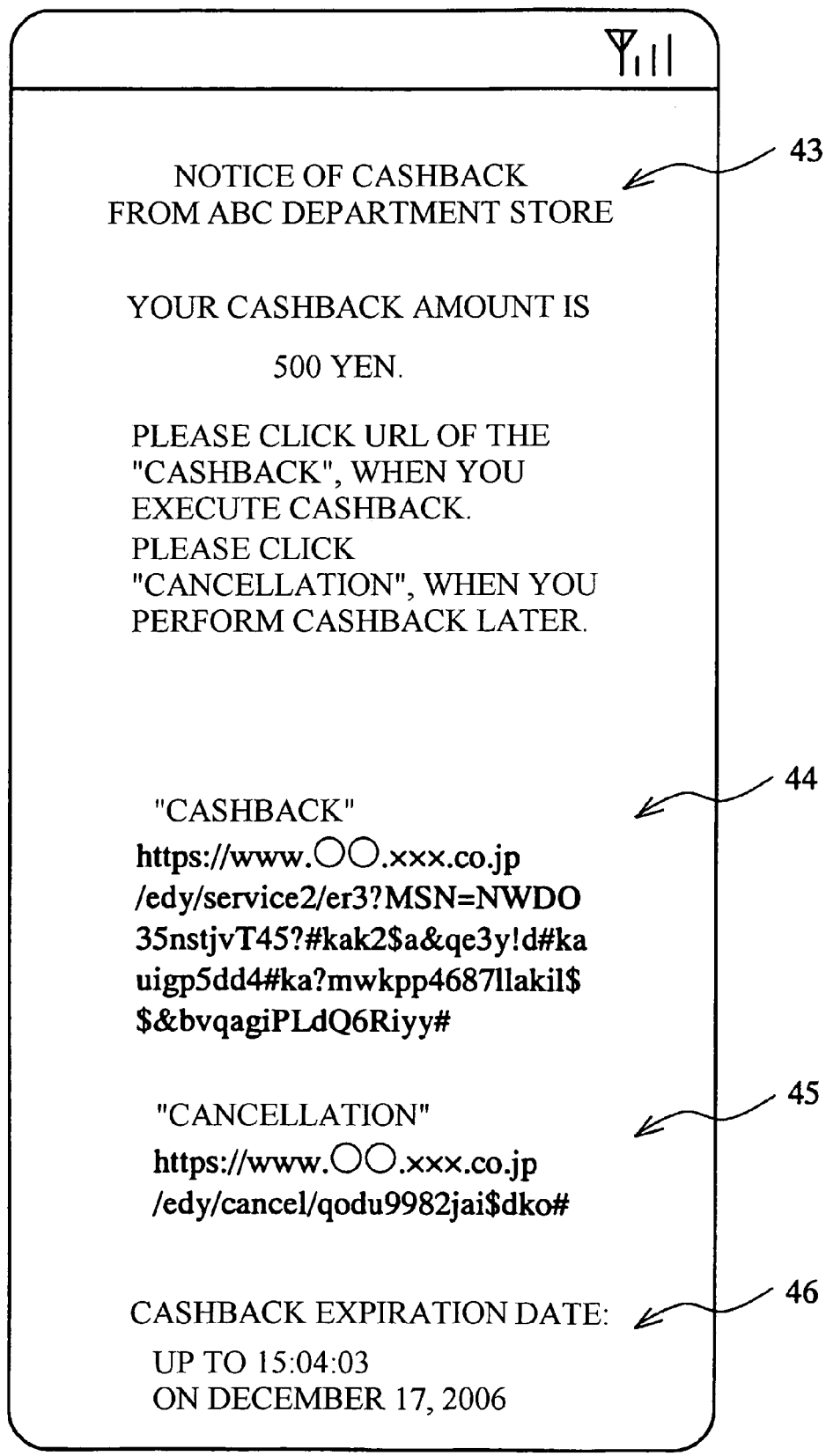
FIG. 8 is a view showing one example of cashback mail displayed on the display of the mobile phone.
Figure 9:
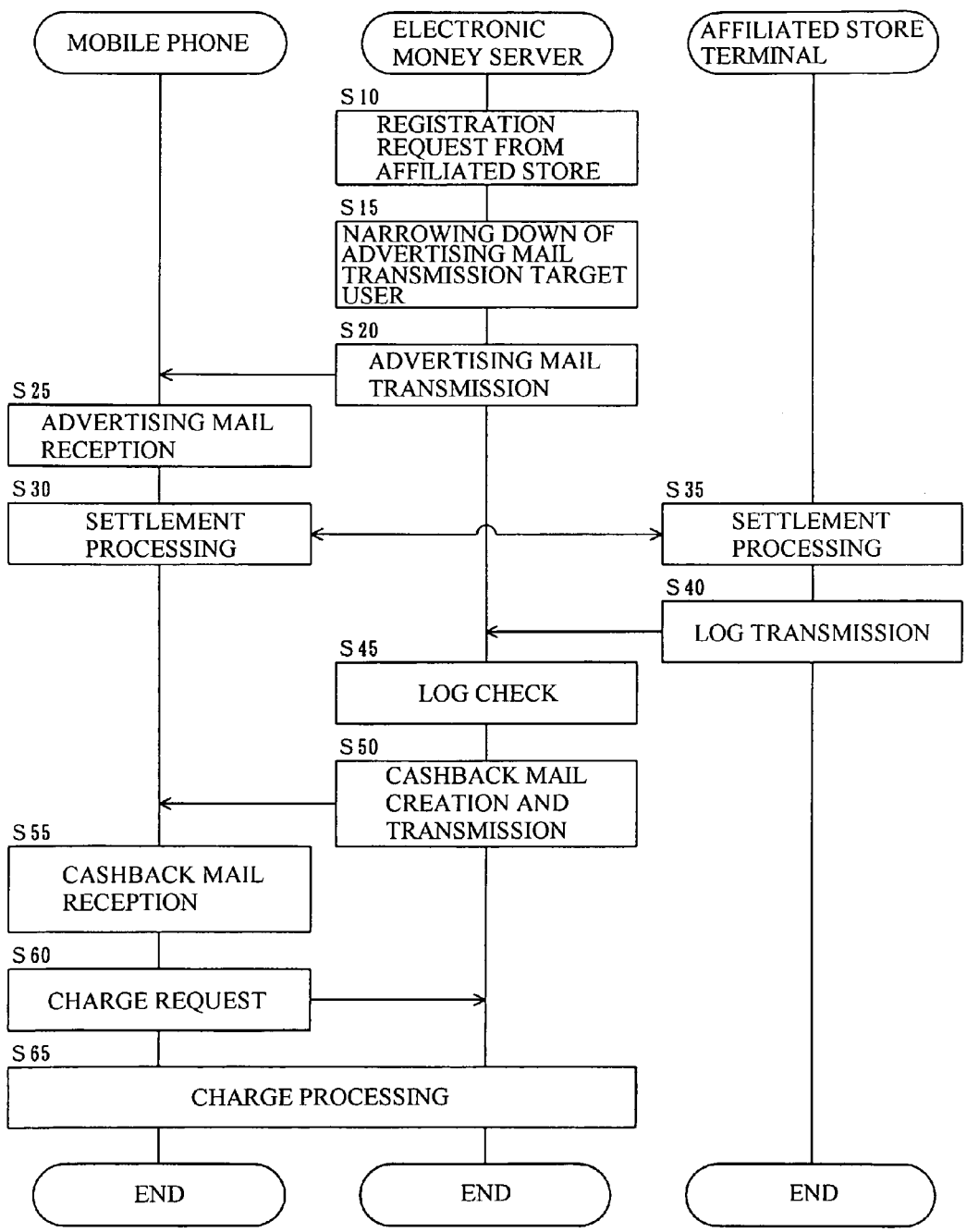
FIG. 9 is a flow chart for explaining a procedure in which the electronic money system provides cashback service to a user.
Figure 10:
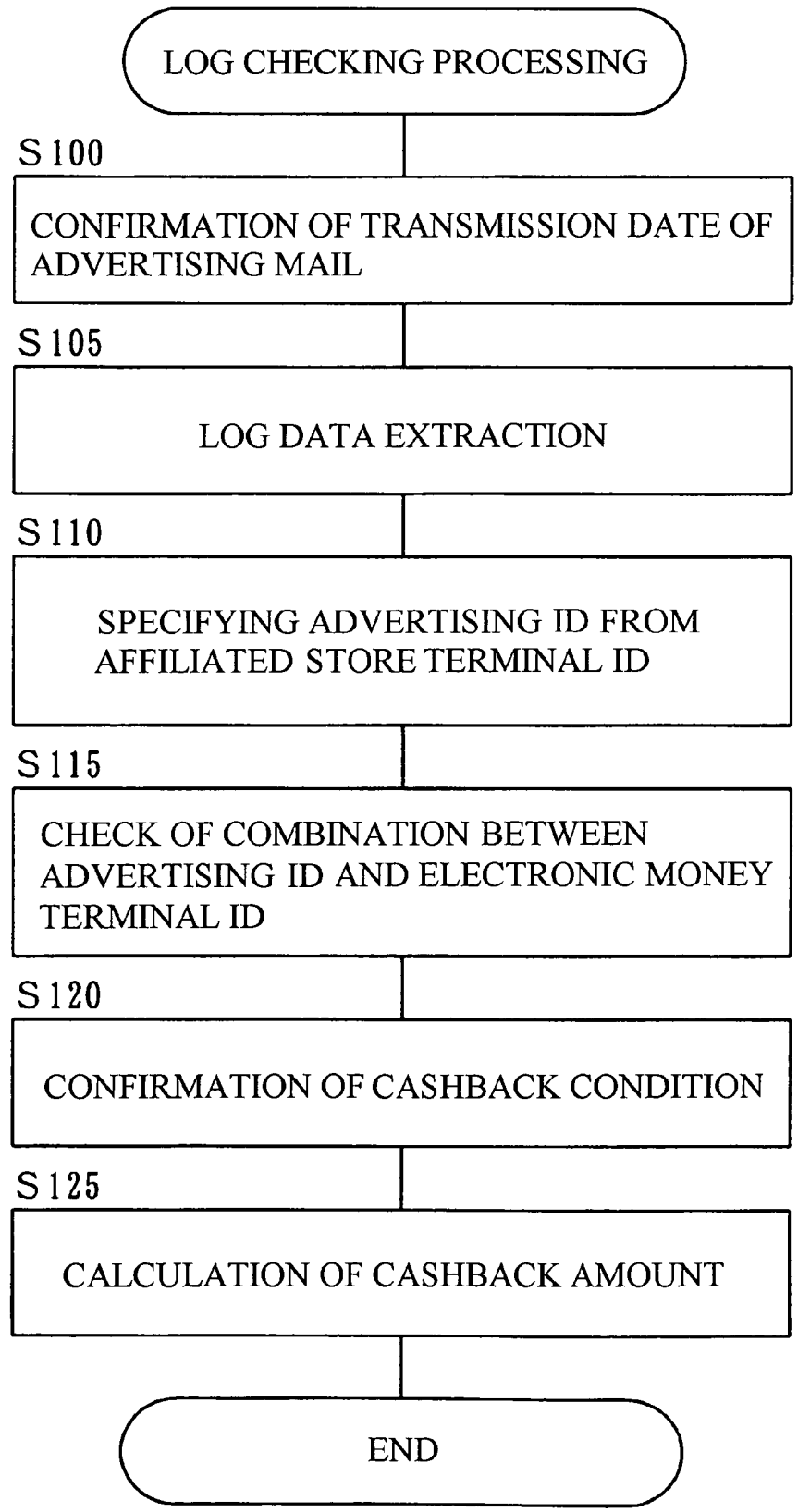
FIG. 10 is a flow chart for explaining log checking processing.
Figure 11:
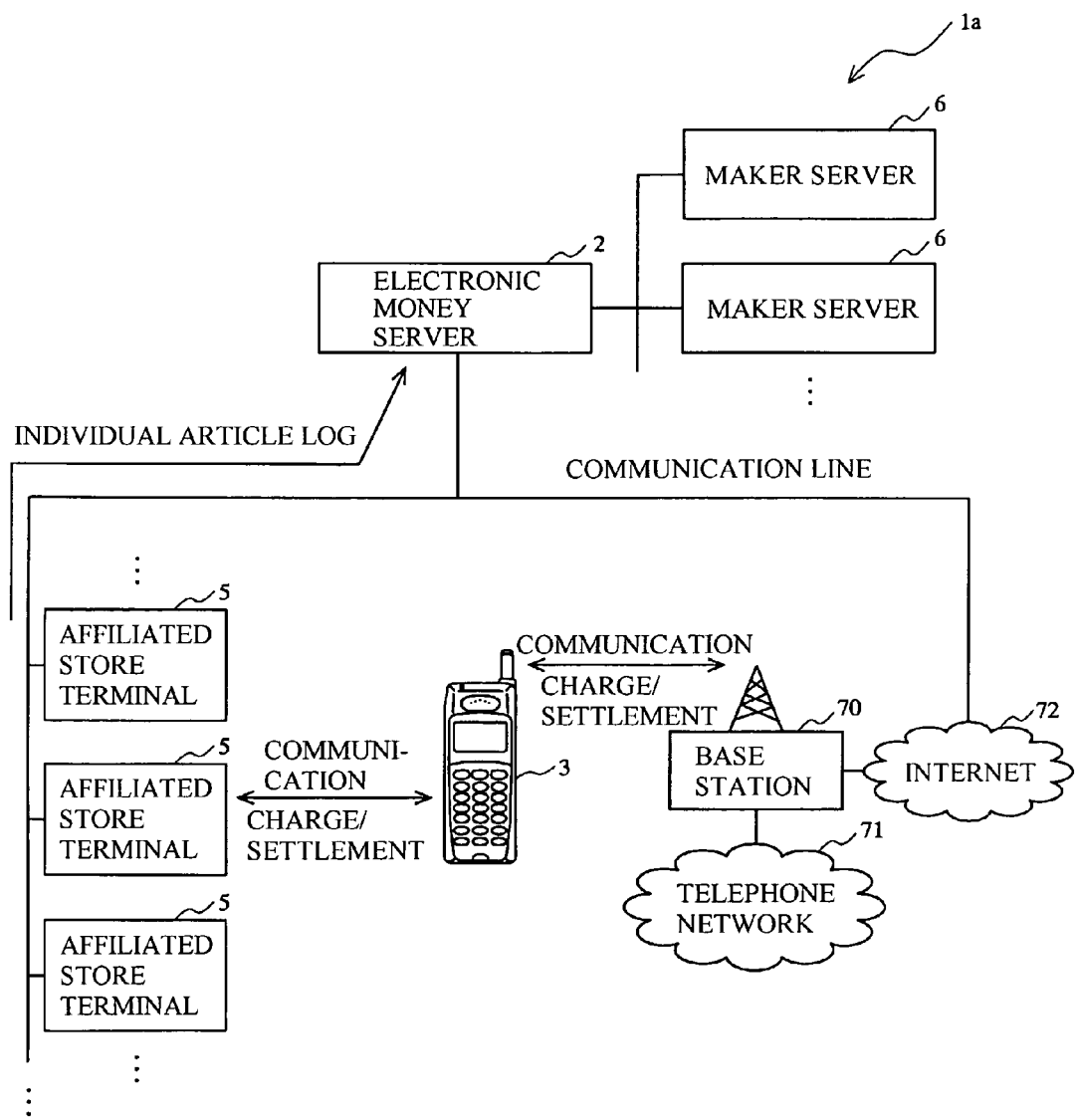
FIG. 11 is a network diagram showing one example of a configuration of an electronic money system in accordance with a modified embodiment of the present embodiment.

EXPLANATION OF REFERENCE 1 electronic money system
2 electronic money server
3 mobile phone 4 affiliated store server
5 affiliated store terminal
6 maker server
11 advertisement request database
12 user information database
13 advertisement destination database
14 affiliated store database
15 log database
21 CPU
22 ROM
23 RAM
24 communication control unit
25 input/output unit
26 bus line
27 storage unit
28 program storage unit
29 data storage unit
31 telephone terminal unit
32 application
33 relay unit
34 interface unit
35 electronic money terminal unit
36 value processing unit
37 storage unit
70 base station
71 telephone network
72 internet

The invention claimed is:

1. An information processing server used in an information processing system that is constituted by a monetary terminal that is specified by a monetary terminal ID associated with an advertising information destination, stores an amount of monetary value as electronic data, and can change the stored amount using amount changing information, an amount changing information input terminal that inputs the amount changing information into the monetary terminal, and an information processing server that can communicate with the monetary terminal and the amount changing information input terminal, the information processing server, comprising:
advertisement transmitting means for transmitting advertising information to the advertising information destination;
associating means for associating the monetary terminal ID associated with the advertising information destination to which the advertising information is transmitted, and an advertising ID of the advertising information to be transmitted with each other to store them in storage means;
ID information receiving means for receiving from the amount changing information input terminal the monetary terminal ID of the monetary terminal that has inputted the amount changing information, and advertising ID specifying information for specifying the advertising ID;
checking means for checking a first group composed of the monetary terminal ID and the advertising ID associated with each other by the associating means, and a second group composed of the received monetary terminal ID and the advertising ID specified by the received advertising ID specifying information; and
amount changing information transmitting means for transmitting to the monetary terminal specified by the associated monetary terminal ID the amount changing information for adding a prescribed amount, if the first group and the second group are coincident with each other in the checking means.

2. The information processing server according to claim 1, wherein the checking means determines a before-and-after relation between an advertisement transmission point when the advertisement transmitting means has transmitted the advertising information, and an amount changing point when the amount changing information input terminal has inputted the amount changing information into the monetary terminal, and if the amount changing point is before the advertisement transmission point, it determines that the first group and the second group are not coincident with each other.

3. The information processing server according to claim 1, further comprising:
change amount receiving means for receiving a changed amount changed by the monetary terminal according to the amount changing information that is inputted into the monetary terminal by the amount changing information input terminal;
prescribed amount calculating means for calculating the prescribed amount using the received changed amount.

4. The information processing server according to claim 1, wherein the advertising ID is associated with an article ID, and the ID information receiving means receives the article ID of the article purchased in exchange for the input of the amount changing information to the monetary terminal as the advertising ID specifying information.

* * * * *